Patented Dec. 8, 1931

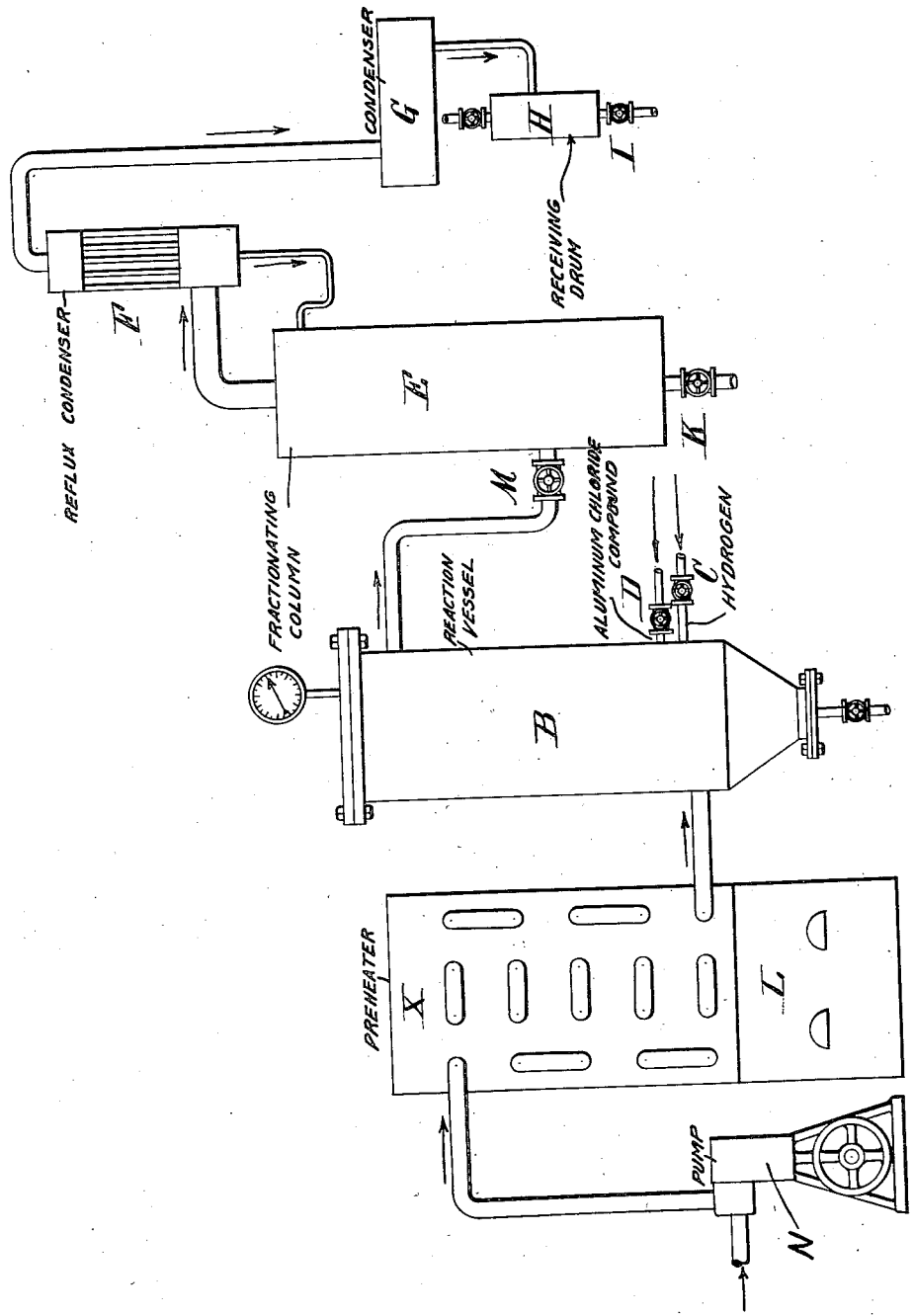

1,835,748

UNITED STATES PATENT OFFICE

OTTO BEHIMER, OF PORT ARTHUR, TEXAS, ASSIGNOR, BY MESNE ASSIGNMENTS, TO THE TEXAS COMPANY, OF NEW YORK, N. Y., A CORPORATION OF DELAWARE

TREATING OIL

Application filed March 18, 1925. Serial No. 16,306.

This invention relates to a process of converting higher boiling hydrocarbon oils into lower boiling oils and the invention broadly contemplates a process which consists in heating oil in contact with aluminum chlorid and hydrogen or a gas containing hydrogen under super-atmospheric pressure.

The conversion of high boiling oils by heating in the presence of aluminum chlorid is well known. As a result of such treatment there is formed a considerable portion of lower boiling oils which may be separated by distillation, leaving a heavy, coky residue in the still, in which the spent aluminum chlorid remains enmeshed. Thus, although a portion of the higher boiling oil has been converted into a product of lower boiling point, there remains a large portion which has been rendered much heavier and more carbonaceous.

One of the features of the conversion of oils by heating with aluminum chlorid is the fact that the low boiling products of the reaction are always of a high degree of saturation. Experiments have shown that the proportion of hydrogen in the low boiling products of the reaction is greater than that of the original unconverted oil as charged, while the proportion of hydrogen in the residue is less than that contained in the original charge; that is, the hydrogen has been added to the lighter oils at the expense of the heavier products.

It is, therefore, an object of my invention to supply extraneous hydrogen to the heated oil in contact with aluminum chlorid whereby, under proper conditions, the hydrogen may be caused to react with the hydrocarbons deficient in hydrogen and to thus obtain increased yields of saturated low boiling oils and with a corresponding reduction in the formation of heavier products and carbon. In the application and practice of my invention, I prefer to proceed as follows:

A comparatively high boiling hydrocarbon oil, such for example as the fractions of petroleum commonly known as gas oil and kerosene, may be charged continuously or intermittently into an enclosed reaction vessel together with aluminum chlorid which may be in varying proportions, although from 5 to 15 percent by weight of the chlorid is usually satisfactory. This may be added to the oil in the form of vapor or as a solid but I prefer to introduce the chlorid into the reaction zone in the form of the liquid hydrocarbon compound resulting from the contacting of aluminum chlorid vapors with oil, as this liquid may be more easily handled and its flow accurately regulated by mechanical means. Hydrogen or a gaseous hydrocarbon rich in hydrogen, under pressure, is admitted to the reaction chamber and is preferably brought in contact with the liquid hydrocarbon and catalyst by bubbling through the mixture or by other means in order to secure intimate contact.

The reaction vessel is arranged to be supplied with heat which may be accurately regulated and the conversion is carried out under super-atmospheric pressure. However, the oil may first be heated to temperatures favorable to the reaction and then passed into the reaction vessel, thus reducing the amount of heat to be supplied to the vessel, or in some cases the preheated oil may supply sufficient heat so that no further heat need be added to effect the conversion. While the temperature best suited to the reaction will vary with the nature of the oil charged, temperatures between 500° and 700° F. will in general prove satisfactory for any petroleum product although lower or higher temperatures may in special instances prove advantageous. The pressures of hydrogen carried within the reaction vessel will be limited chiefly by the capacity of the apparatus to withstand internal pressure but the pressure used will preferably be in excess of 800 pounds per square inch. Lower pressures may be used but the resulting reduction in concentration of hydrogen in the reaction zone serves to retard the reaction and, at pressures as low as atmospheric pressure, substantially no hydrogenation may be accomplished. The oil, aluminum chlorid, and hydrogen are passed through the reaction zone at such a rate that the desired degree of conversion will be effected.

From the reaction chamber the mixture of oil and aluminum chlorid is expanded into a container or still maintained at a substantially lower pressure, preferably about atmospheric pressure, when the low boiling products of the reaction are distilled off from the unconverted oil. The excess hydrogen and hydrocarbon gases may be separated from the condensable gases and recompressed and returned to the reaction chamber. The unconverted oil may also be separated from any spent aluminum chlorid and returned for further conversion although it is of course advantageous to operate under such conditions that the proportion of unconverted oil shall be at a minimum.

It should be pointed out that the degree of conversion obtained through the practice of my invention will depend upon several factors such as time and intimacy of contact between the reacting substances, temperature, and pressure under which the reaction is carried out. It is also true that the character of the oil which is used as charging stock and which is to be converted influences to a great extent the degree of conversion.

The accompanying drawing represents in diagrammatic form, an apparatus suitable for the practice and application of my invention. Referring to the drawing, a preheater X, heated by the furnace L, serves to apply heat to the oil charge supplied from a source (not shown) by the pump N, from which it is forced into the reaction vessel B which is maintained under pressure suitable for the reaction. Hydrogen is supplied to the reaction vessel under pressure through the pipe C and aluminum chlorid, preferably as the liquid hydrocarbon compound, through the connection at D. The vessel B may be supplied with a source of heat or may be heavily insulated to conserve the heat contained within the preheated charge. The oil, aluminum chlorid and hydrogen are passed through the reaction vessel at such a rate that the desired degree of conversion may take place and are then expanded to lower pressures through the valve M into the chamber E which may preferably take the form of a distilling column of any well known type. The lower boiling constituents are vaporized and distilled off through the column, the reflux condenser F supplying reflux for fractionation; the unconverted oil and aluminum chlorid are withdrawn from the lower portion of the vessel E through the valve K. The lighter vapors together with uncombined hydrogen are passed through the condenser G and then into the separating drum H. The condensed low boiling hydrocarbons are withdrawn through the valve I to storage while the non-condensable portion consisting chiefly of hydrogen is returned to the reaction vessel.

As an example of preferred operating conditions which may prevail in the process as described, the oil may be heated to approximately 700° F. in the preheater. The oil is then contacted with aluminum chloride and hydrogen in the reaction vessel for the required length of time at a pressure of approximately 2000 pounds per square inch. Although a pressure of about 800 pounds per square inch has been mentioned as about the lower limit which may be practical from a commercial standpoint, the higher pressure of approximately 2000 pounds per square inch is much more desirable in view of the increased reaction taking place under conditions of increased pressure.

Obviously many modifications and variations of the invention, as hereinbefore set forth, may be made without departing from the spirit and scope thereof, and therefore, only such limitations should be imposed as are indicated in the appended claims.

I claim:

1. The process of converting higher boiling hydrocarbon oil into lower boiling hydrocarbon oil which comprises heating the oil to a temperature suitable for conversion, introducing the heated oil into a reaction vessel maintained under a pressure exceeding 800 lbs. per square inch, passing hydrogen and aluminum chlorid-hydrocarbon compound into said reaction chamber and maintaining the oil contents of the reaction chamber at a conversion temperature and under substantially liquid phase conditions until the desired degree of conversion has taken place.

2. The process of converting higher boiling hydrocarbon oil into lower boiling oil which comprises maintaining the oil at a temperature suitable for conversion, in the presence of aluminum chloride and a gas comprising hydrogen, while under a pressure exceeding 800 lbs. per square inch until the desired degree of conversion has been effected.

3. The process of converting higher boiling hydrocarbon oil into lower boiling oil which comprises maintaining the oil at a temperature suitable for conversion, in the presence of aluminum chloride and a gas comprising hydrogen, while under a pressure exceeding 800 lbs. per square inch until the desired degree of conversion has been effected, and then distilling the lower boiling oil from the higher boiling portion and aluminum chloride residue at a lower pressure.

4. The process of converting higher boiling hydrocarbon oil into lower boiling oil which comprises maintaining the oil at a temperature suitable for conversion, in the presence of aluminum chloride and a gas comprising hydrogen, while under a pressure in excess of and about 800 pounds per square inch until the desired degree of conversion has been effected.

5. The process of converting higher boiling hydrocarbon oil into lower boiling oil which comprises heating the oil to a temperature suitable for conversion, introducing the heated oil into a reaction vessel maintained under a pressure exceeding 800 pounds per square inch in the presence of aluminum chloride and a gas comprising hydrogen, cooling the products of the reaction, separating gases comprising hydrogen therefrom, and recycling said gases to the reaction vessel.

In witness whereof I have hereunto set my hand this 23rd day of February, 1925.

OTTO BEHIMER.